United States Patent
Hammer et al.

(10) Patent No.: US 7,968,161 B2
(45) Date of Patent: Jun. 28, 2011

(54) CELLULOSE HYDRATE SAUSAGE CASING FEATURING MINIMUM MEAT CLING

(75) Inventors: Klaus-Dieter Hammer, Mainz (DE); Udo Kuenzel, Geisenheim (DE); Volker Effern, Bad Schwalbach (DE)

(73) Assignee: Kalle GmbH, Wiesbaden (DE)

( * ) Notice: Subject to any disclaimer, the term of this patent is extended or adjusted under 35 U.S.C. 154(b) by 23 days.

(21) Appl. No.: 10/592,440

(22) PCT Filed: Mar. 19, 2005

(86) PCT No.: PCT/EP2005/002949
§ 371 (c)(1),
(2), (4) Date: Sep. 12, 2006

(87) PCT Pub. No.: WO2005/092108
PCT Pub. Date: Oct. 6, 2005

(65) Prior Publication Data
US 2007/0172558 A1    Jul. 26, 2007

(30) Foreign Application Priority Data

Mar. 25, 2004   (DE) .................. 10 2004 015 088

(51) Int. Cl.
*B32B 1/02* (2006.01)
*B32B 1/08* (2006.01)
*B32B 23/00* (2006.01)
*B32B 23/02* (2006.01)

(52) U.S. Cl. ............... 428/34.8; 428/34.1; 428/34.2; 428/35.7; 428/35.9; 428/36.9

(58) Field of Classification Search ............. 428/34.1, 428/34.2, 35.9, 36.9, 34.8, 35.7
See application file for complete search history.

(56) References Cited

U.S. PATENT DOCUMENTS

| | | | |
|---|---|---|---|
| 2,901,358 A | 8/1959 | Underwood et al. | 138/118.1 |
| 3,582,364 A | 6/1971 | Rose et al. | |
| 5,143,584 A * | 9/1992 | Hammer et al. | 162/175 |
| 5,358,784 A | 10/1994 | Hammer et al. | |
| 5,595,796 A * | 1/1997 | Hammer et al. | 428/34.8 |

FOREIGN PATENT DOCUMENTS

| | | |
|---|---|---|
| DE | 1 492 699 | 2/1969 |
| DE | 2 259 671 | 12/1974 |
| DE | 32 08 283 A1 | 9/1983 |
| DE | 34 47 026 A1 | 7/1985 |
| DE | 44 07 288 A1 | 9/1995 |
| EP | 0 287 967 A1 | 10/1988 |
| EP | 0 502 431 A1 | 9/1992 |
| EP | 0 676 143 A2 | 10/1995 |
| EP | 1 042 958 A1 | 10/2000 |

* cited by examiner

*Primary Examiner* — Marc A Patterson
(74) *Attorney, Agent, or Firm* — ProPat, L.L.C.

(57) ABSTRACT

A tubular sausage casing is disclosed that is based on cellulose and includes an interior impregnation containing at least one adhesive component and at least two separating components. The adhesive component and one of the separating components are bound to the cellulose of the casing while the second separating component is not bound. The inventive casing is used for mild or aged dry sausages, especially California-style salami.

22 Claims, No Drawings

CELLULOSE HYDRATE SAUSAGE CASING FEATURING MINIMUM MEAT CLING

CROSS-REFERENCE TO RELATED APPLICATIONS

This application is being filed under Rule 1.371 as a National Stage Application of pending International Application No. PCT/EP2005/002949, which claims priority to the following parent application: German Patent Application No. 10 2004 015 088.5, filed Mar. 25, 2004. Both International Application No. PCT/EP2005/002949 and German Patent Application No. 10 2004 015 088.5 are hereby incorporated by reference herein in their entirety.

FIELD OF THE INVENTION

The invention relates to a tubular sausage casing based on cellulose hydrate which is impregnated on the inside with reactive adhesion and release components, and also to a method for producing the sausage casing.

BACKGROUND OF THE INVENTION

Sausage casings based on cellulose hydrate have been widespread for decades. The adhesion to scalded sausage meat emulsion is so great that the casing can only be taken off with tearing of the emulsion surface. In the case of dry or semi-dry sausage, the adhesion, in contrast, is so low that the casing, during sausage ripening, detaches (is cast off), does not co-shrink and forms pleats. In the intermediate space between casing and emulsion surface, frequently unwanted mold forms.

In order to improve, in the instance of dry or semi-dry sausage, the adhesion of the casing, various adhesion impregnations have been proposed which are applied to the inside of the casing. They contain, for example, cellulose-linked natural proteins, polyamide-polyamine-epichloro-hydrin resins, or chitosan which is covalently bonded to the cellulose using glyoxal.

For sausage casings having a smooth inner surface, as may be found in double-viscose-treated fibrous skins or in the case of cellophane skins, reactive adhesion components combined with an oil have proved advantageous. The oil component is, in particular, a triglyceride, paraffin oil or a silicone oil (DE 32 08 283). In addition, for dry or semi-dry sausage, internal impregnations have been developed which contain a combination of reactive release and adhesion components (DE 44 07 288). Using such an internal impregnation, a balanced relationship of good peelability with simultaneously sufficient adhesion may be achieved.

In addition, numerous release preparations have been developed. These contain, in particular, chromium-fatty acid complexes (U.S. Pat. No. 2,901,358), dialkylketenes having long-chain alkyl radicals (DE 14 92 699), perfluorinated compounds (DE 22 59 671) or lecithin (EP 0 502 431=U.S. Pat. No. 5,358,784).

As a result of industrial processing, increasingly high and more specific requirements are being made of the quality of sausage casings. For the pizza salami demanded in high amounts in the North American market, cellulose fiber skins are required which have an exact caliber constancy (that is there are virtually no variations in the diameter of the casing) and have a sufficiently rough surface so that long sections (up to about 3.2 m) can be pushed onto the stuffing horn without any problems. After a ripening time of only 10 to 12 days, the casing must be able to be peeled off very readily. For this the adhesion must be only very low. However, it must be sufficient so that the casing is not cast off, as a result of which space is formed in which mold can develop.

Particularly high requirements are made of a casing for mold-ripened California-type salami. This type of salami is ripened over a long period under optimum external conditions. If these conditions are not met, then the mold forms cellulases which break down the casing material. The casing must therefore be particularly easily peelable, so that even a casing attacked by cellulitic enzymes can still be taken off without defects. This task cannot be met using the internal impregnations known hitherto.

EP-A 676 143 (=U.S. Pat. No. 5,595,796) discloses a cellulose casing which is impregnated on the inside with a mixture of a release component and an adhesion component. The adhesion component is preferably a natural protein, chitosan, an aminoplast precondensate or a polyamine-polyamide-epichlorohydrin resin, whereas the release component is preferably a chromium-fatty acid complex or a diketene having long-chain fat-like substituents. This casing also cannot meet the requirements, since the adhesion-increasing action of the protein component is not sufficiently compensated for and covered by the adhesion-decreasing action of the dialylketenes. The inside of the casing alone with chromium-fatty acid complexes (U.S. Pat. No. 2,901,358) or alone with dialkylketenes (DE 14 92 699) then leads itself to a detaching of the casing from the emulsion if this is only applied in a small amount. This route to a solution is thus likewise excluded.

SUMMARY OF ADVANTAGEOUS EMBODIMENTS OF THE INVENTION

The object was therefore still to provide, for cellulose-based sausage casings, an internal impregnation which ensures sufficient adhesion over the entire ripening time of the sausage, so that the casing is nowhere cast off. At the same time, the casings are to adhere only minimally during peeling.

The object has been achieved by an internal impregnation which contains an adhesion component and at least two release components, in addition to the adhesion component, only one of the release components being bound to the cellulose of the casing, but the other not. This was surprising to the extent that the specialist field had assumed that even a low addition of a release component in dry or semi-dry sausage ripening leads to casting off of the casing.

DETAILED DESCRIPTION OF ADVANTAGEOUS EMBODIMENTS OF THE INVENTION

The present invention therefore relates to an internally impregnated, tubular sausage casing based on cellulose, wherein the impregnation comprises at least one adhesion component and at least two release components, the adhesion component and one of the release components being bound to the cellulose of the casing, whereas a further release component is unbound.

As adhesion component, preference is given to natural proteins of animal or plant origin, in particular casein, gelatin, wheat protein or soya protein, in addition also chitosan, aminoplast precondensates or polyamine-polyamide-epichlorohydrin resins.

The adhesion component is bonded to the cellulose of the casing expediently using crosslinkers. These are compounds having 2 or more reactive groups which bind the compounds used as adhesion component to the cellulose, if appropriate also to one another. Particularly suitable crosslinkers, in particular for proteins and chitosan, are dialdehydes such as glyoxal or glutaraldehyde. The adhesion component is correspondingly generally covalently bonded to the cellulose of the casing.

Suitable release components which are firmly bonded to the cellulose of the casing are, especially, chromium-fatty acid complexes (obtainable, for example, under the name QUILON®), reactive silicones, diketenes having long, fat-like aliphatic, cycloaliphatic, araliphatic and/or aromatic radicals (AQUAPEL® from Hercules Inc.). The diketene is the dimer of a ketene of the formula RR'C=C=O, where the radicals R and R' are identical or different and are a hydrogen atom, $(C_4-C_{20})$alkyl, $(C_4-C_{20})$cycloalkyl, $(C_6-C_{20})$aryl or $(C_7-C_{20})$aralkyl, with the proviso that R and R' are not simultaneously a hydrogen atom. Preference is given to dimers of ketenes where R is $(C_8-C_{20})$alkyl and R' is a hydrogen atom. The bound release component is generally bonded to the cellulose covalently, or via a strong ionic bond (in the case of chromium-fatty acid complexes). It virtually cannot be removed from the casing by water or other compositions (such as glycerol) occurring in the production or processing of sausage casings.

The unbound release component generally comprises no reactive groups which could effect firm binding to the cellulose under the customary conditions in application or internal impregnation or thereafter. Preferably, for the unbound release component, use is made of perfluoroethylene dispersions (HOSTAFLON®), polyethylene dispersions (EPO-TAL® from BASF Aktiengesellschaft), lecithin and, particularly preferably, wax dispersions. The wax dispersions in this case can be dispersions of natural waxes, chemically modified natural waxes or synthetic waxes. The natural waxes may be subdivided into a) plant waxes, especially natural waxes such as candelilla, carnauba, Japan, espartogras, Ouricoury wax, or montan wax; b) animal waxes, such as shellack, and c) mineral waxes, such as ceresin, earth wax, petrolatum, paraffin or microwaxes. A particularly suitable wax comprises a mixture of esters of $(C_{24}-C_{34})$montanic acid with alcohols. It is obtainable under the name KPS-wax from Clariant Deutschland GmbH. The unbound release component is not bonded to the cellulose either covalently, nor ionically, nor in any other manner.

The cellulose casing impregnated on the inside with these components exhibits minimum adhesion to the sausage emulsion without it detaching in an undesirable manner therefrom.

A suitable internal impregnation for a salami which is ripened only for a short time and therefore adheres strongly, comprises about 0.8 to 1.2% by weight of protein, preferably casein,
4 to 5% by weight * of alkyldiketene (use is made, for example, of an aqueous suspension which comprises about 7.6% by weight of alkyldiketene, obtainable under the name AQUAPEL®)
0.1 to 0.3% by weight of wax, preferably KPS wax.

An internal impregnation of this type which is particularly suitable for a pizza salami contains about 1% by weight of casein (+3% by weight of glyoxal, based on the weight of the casein),
4.5% by weight of alkyldiketene (use is made, for example, of an aqueous suspension which contains about 7.6% by weight of alkyldiketene; AQUAPEL®) and
0.2% by weight of wax, preferably KPS wax.

A further suitable internal impregnation contains about 0.2 to 0.6% by weight of a polyamine-polyamide-epichlorohydrin resin ( LURESIN® KTU from BASF Aktiengesellschaft; use is made of a solution having 12.5% by weight of solid),
0.6 to 1.0% by weight of a chromium-fatty acid complex ( MONTACELL® CF; use is made of a solution having 40% by weight of solids; the solvent used is a mixture of 48.5 to 52.5% by weight of isopropanol, 8 to 10% by weight of acetone and 37.5 to 43.5% by weight of water and
0.05 to 0.2% by weight of KPS wax.

A preferred embodiment thereof comprises 0.4% by weight of Luresin KTU,
0.8% by weight of Montacell CF and
0.1% by weight of KPS wax.

The two abovementioned general formulas are also suitable for dry or semi-dry sausage which was ripened under optimum gentle conditions without hardening of the sausage emulsion surface.

For a California-type salami mold-ripened under optimum conditions, a somewhat modified internal impregnation has proved to be particularly expedient. This is because in this type of salami, the casing after ripening is frequently weakened by the attack of cellulase, and can only adhere minimally, so that it still may be removed in one piece. This modified internal impregnation generally comprises 0.1 to 0.5% by weight of Luresin LURESIN® KTU,
4 to 5% by weight of alkyldiketene and
0.1 to 0.3% by weight of KPS wax.

A specific embodiment of this internal impregnation contains, for example, 0.2% by weight of Luresin LURESIN® KTU,
4.5% by weight of alkyldiketene (in the form of an about 7.6% strength by weight aqueous suspension) and
0.2% by weight of KPS wax.

In a preferred embodiment, the inventive sausage casing is further provided on the on the outside with a resin preparation which increases the resistance to enzymatic breakdown. The outer preparation comprises, for example, a mixture of a water-insoluble cationic resin (in particular an epichlorohydrin-crosslinked polyamine-polyamide resin) and a PVC pigment (as described in EP-A 0 287 967=U.S. Pat. No. 4,967, 798). The pigments increase the roughness of the outside of the casing which facilitates handling during stuffing, particularly when long sections of the casing are to be stuffed.

The inventive sausage casing is produced by methods which are known in principle to those skilled in the art. Generally, the internal impregnation is applied in an in-line method. For this, an aqueous solution having the above-described constituents is charged into the cellulose hydrate gel tube and kept stationary as a liquid bubble in a continuously reforming loop of the cellulose gel tube advanced in the machine direction. Thereafter, the tube is dried. For this it is inflated and charged, for example, with hot air. Before or after application of the internal impregnation, a further impregnation can be applied to the outside, which impregnation increases its roughness and/or its cellulase resistance. This is expediently achieved using a roller application device.

The inventive sausage casing is used especially for short-time or long-time ripened dry or semi-dry sausage, preferably for California-type salami. Particularly for large-scale industrial use, the inventive internal impregnation represents a significant advance.

The examples hereinafter serve to explain the invention. Percentages herein are percentages by weight, unless stated otherwise, or immediately clear from the context.

EXAMPLE 1

An externally viscose-treated cellulose fiber skin having a diameter of 48 mm (caliber 48), after the plasticizer vat (this contained an aqueous glycerol solution), was impregnated on the outside with the following composition using a roller application device:
1000 ml of a 12.5% strength aqueous preparation of a polyamine-polyamide-epichlorohydrin resin (LURESIN® KTU),
180 ml of a 10% strength NaOH solution,
60 ml of glycerol,
60 ml of a 60% strength aqueous PVC latex E dispersion,
1050 ml of a 20% strength aqueous sodium acetate solution and
7650 ml of water.

The outer preparation serves to improve the cellulase resistance and to facilitate the stuffing of long sections.

Upstream of the dryer inlet, the gel tube was then internally impregnated with 6 liters of the following composition:
6000 ml of an aqueous AQUAPEL® XS 360 suspension (contained 4.5% alkyldiketene),
3488.3 ml of water,
100 g of casein,
50 ml of a 10% strength aqueous NaOH solution,
11.7 ml of a 40% strength aqueous glyoxal solution and
50 ml of a 40% strength aqueous KPS wax dispersion.

For this, the aqueous composition was kept stationary in the form of a liquid bubble in a continuous newly forming loop, while the fibrous skin was advanced in the machine direction (known as "slug coating").

The gel tube impregnated internally and externally in this way then passed through a squeeze-roll pair. Downstream of the squeeze-roll pair, the gel tube was inflated and passed to a hot air dryer. After leaving the dryer it was conditioned to a moisture content of 8 to 10% and wound up. The roll good was then finally processed to form sections tied off at one end each of 3.2 m in length.

The sections were stuffed with salami emulsion (pizza salami). After ripening (12 days) the casing could very readily be removed, the sausage emulsion surface remaining completely intact (that is not roughened at any point or actually torn).

EXAMPLE 2

An externally viscose-treated cellulose fibrous skin of caliber 60 was internally impregnated, upstream of the dryer inlet, by the method mentioned in Example 1 using 8 liters of the following composition:
200 ml of a 0.8% strength aqueous MONTACELL®CF preparation,
150 ml of a 12.5% strength aqueous LURESIN® KTU preparation,
2.5 ml of a 40% strength aqueous KPS wax dispersion,
0.15 ml of glycerol and
8950 ml of water.

The tube which was impregnated on the inside was dried as described in the inflated state in a hot-air dryer, then moistened up to a moisture content of 16 to 18% and finally shirred in sections to give what are termed shirred sticks. The casing which was finally processed in this manner was stuffed with salami emulsion. After ripening for several weeks under optimum conditions, the casing exhibited minimum meat cling, so that it was able to be removed very readily, without the emulsion surface being damaged.

EXAMPLE 3

10 liters of the following composition were charged into a double-viscose-treated (80% externally/20% internally) cellulose fiber skin of caliber 68:
750 ml of a 7.6% strength aqueous AQUAPEL® XS 360 suspension,
150 ml of a 12.5% strength LURESIN® KTU preparation,
2.5 ml of a 40% strength KPS wax dispersion,
0.15 ml of glycerol and
8950 ml of water.

To produce the cellulose fiber skin, in addition a viscose was used, into which a solution of Na alginate and GAFQUAT® had been added. Since the alginate acts as a permanently acting ("primary") plasticizer, the fibrous skin contained in addition only 10% of the glycerol acting as secondary plasticizer instead of the otherwise conventional 22%. Adding alginate and GAFQUAT®, in addition, improved the ripening properties, such as also cellulase resistance, which is of particular importance for mold-ripened salami.

In addition, the outside of the fibrous skin was, as described in Example 1, impregnated with polyamine-polyamide-epichlorohydrin resin and PVC pigments.

The tube was then moistened to a water content of 8 to 10% and wound up to form a roll. The roll product was in turn finally processed to form sections tied off at one end which were then stuffed with salami emulsion and mold-ripened under conditions typical of California-type salami.

After ripening, the casing exhibited only minimum adhesion. Therefore it was readily peeled off (and also curled off). Damage due to the action of cellulases was not recognizable.

The invention claimed is:

1. An internally coated, tubular sausage casing comprising cellulose, wherein the coating comprises at least one adhesion component and at least two release components, the adhesion component and one of the release components being bound to the cellulose of the casing, whereas the other of the release components is unbound,
   wherein said bound release component and unbound release component are present in a weight ratio ranging from 57:1 to 1.6:1,
   said bound release component and said adhesion component are present in a weight ratio ranging from 3.3:1 to 50:1, and
   the unbound release component is present within the coating in a total amount ranging from 0.05 to 0.3% by weight.

2. The sausage casing as claimed in claim 1, wherein the adhesion component bound to the cellulose is a natural protein of animal or plant origin, an aminoplast precondensate, or a polyamine-polyamide-epichlorohydrin resin.

3. The sausage casing as claimed in claim 1, wherein the adhesion component is bound to the cellulose of the casing using at least one crosslinker.

4. The sausage casing as claimed in claim 3, wherein the crosslinker is a dialdehyde.

5. The sausage casing as claimed in claim 1, wherein the release component bound to the cellulose is a chromium-fatty acid complex, a reactive silicone, or a diketene having long fat-like aliphatic, cycloaliphatic, araliphatic and/or aromatic radicals.

6. The sausage casing as claimed in claim 1, wherein the unbound release component comprises a perfluoroethylene dispersion, a polyethylene dispersion, lecithin and/or a wax.

7. The sausage casing as claimed in claim 6, wherein the wax is a natural wax.

8. The sausage casing as claimed in claim 1, wherein it is internally coated with a mixture comprising 0.8 to 1.2% by weight of protein, 4 to 5% by weight of alkyldiketene and 0.1 to 0.3% by weight of wax.

9. The sausage casing as claimed in claim 1, wherein it is internally coated with a mixture comprising 0.2 to 0.6% by weight of a polyamine-polyamide-epichlorohydrin resin, 0.6 to 1.0% by weight of a chromium-fatty acid complex and 0.05 to 0.2% by weight of a wax.

10. The sausage casing as claimed in claim 1, wherein it is provided on the outside with a resin preparation which increases the resistance to enzymatic breakdown.

11. The sausage casing as claimed in claim 10, wherein the external preparation comprises a mixture of a water-insoluble cationic resin and a PVC pigment.

12. A method for producing a tubular sausage casing as claimed in claim 1, which comprises (i) coating the inside of the sausage casing with an aqueous composition which comprises at least one adhesion component and at least two release components, of which the adhesion component and one of the release components are bound to the cellulose of the casing, and the other release component is not bound, and (ii) drying the sausage casing.

13. A sausage casing as claimed in claim 1 for short-time or long-time ripened dry or semi-dry sausage.

14. A sausage casing as claimed in claim 2, wherein the natural protein is casein, gelatin, wheat protein, soya protein or chitosan.

15. A sausage casing as claimed in claim 4, wherein the dialdehyde is glyoxal or glutaraldehyde.

16. A sausage casing as claimed in claim 7, wherein the wax is montan wax.

17. A sausage casing as claimed in claim 16, wherein the wax is a mixture of esters of ($C_{24}$-$C_{34}$) montanic acids with alcohols.

18. A sausage casing as claimed in claim 8, wherein the protein is casein.

19. A sausage casing as claimed in claim 11, wherein the cationic resin is an epichlorohydrin-crosslinked polyamine-polyamide resin.

20. A sausage casing as claimed in claim 13, wherein the sausage is a California-type salami.

21. A sausage casing as claimed in claim 1, wherein said adhesion component comprises 0.8 to 1.2% by weight of protein or 0.2 to 0.6% by weight of a polyamine-polyamide-epichlorohydrin resin, and the unbound release component is a wax.

22. The sausage casing as claimed in claim 1, wherein the release component bound to the cellulose is an alkyldiketene.

* * * * *